United States Patent [19]

Codazzi et al.

[11] Patent Number: 4,920,795
[45] Date of Patent: May 1, 1990

[54] ELECTROMAGNETIC FLOWMETER FOR CONDUCTIVE OR DIELECTRIC FLUIDS AND ITS APPLICATIONS IN PARTICULAR OILFIELD

[75] Inventors: Daniel Codazzi; Jean-Yves Mioque, both of St Etienne; Bernard Montaron, St Priest en Jarez, all of France

[73] Assignee: Dowell Schlumberger Incorporated, Tulsa, Okla.

[21] Appl. No.: 123,074

[22] Filed: Nov. 19, 1987

[30] Foreign Application Priority Data

Nov. 25, 1986 [FR] France ............................ 86 16529
Nov. 26, 1986 [FR] France ............................ 86 16607

[51] Int. Cl.$^5$ ........................ G01F 1/58; G01F 1/712
[52] U.S. Cl. .................................. 73/195; 73/861.06; 73/861.12
[58] Field of Search ................. 73/195, 196, 861.06, 73/861.12, 861.14, 861.08, 861.09, 861.05

[56] References Cited

U.S. PATENT DOCUMENTS

| | | | |
|---|---|---|---|
| 3,184,967 | 5/1965 | Rogers | 73/861.08 |
| 3,813,939 | 6/1974 | Head | 73/861.06 |
| 4,201,083 | 5/1980 | Kurita et al. | 73/861.06 |
| 4,236,410 | 12/1980 | Appel et al. | 73/861.12 |
| 4,236,411 | 12/1980 | Ketelson | 73/861.12 |
| 4,257,275 | 3/1981 | Kurita et al. | 73/861.06 |
| 4,325,261 | 4/1982 | Freund et al. | 73/861.12 |
| 4,329,879 | 5/1982 | Appel et al. | 73/861.12 |
| 4,402,230 | 9/1983 | Raptis | 73/861.06 |

Primary Examiner—Charles A. Ruehl
Attorney, Agent, or Firm—Stephen A. Littlefield

[57] ABSTRACT

The invention is a non-intrusive system for measuring the flow rates of insulating or conducting fluids in conduits. It results from the combination of an electromagnetic flowmeter, operating with conducting fluids, and of a triboelectric noise cross-correlation flowmeter, operating with insulating fluids. The system is equipped with a non-intrusive device for measuring fluid conductivity. The electronic signal processing unit uses the conductivity value to decide which of the two sensors is providing a signal effectively representing the fluid flow rate. The electromagnetic flowmeter may use electrodes of small cross-section in contact with the fluid or, more advantageously, it may be of the capacitive type using larger section electrodes isolated from the fluid.

9 Claims, 9 Drawing Sheets

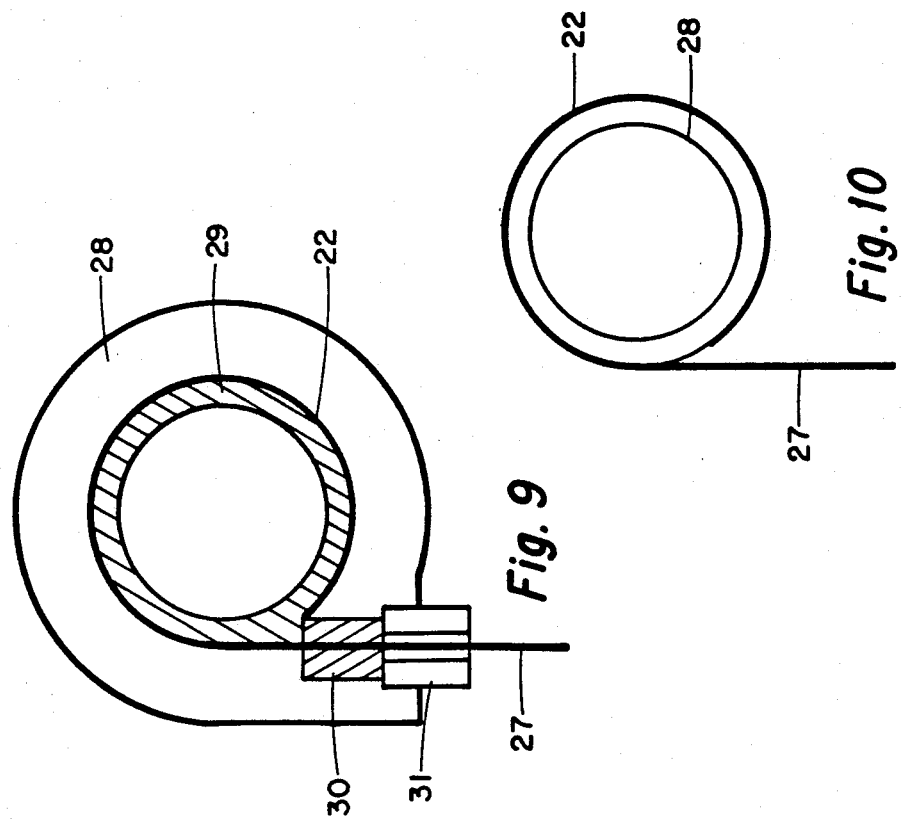
Fig. 10
Fig. 9
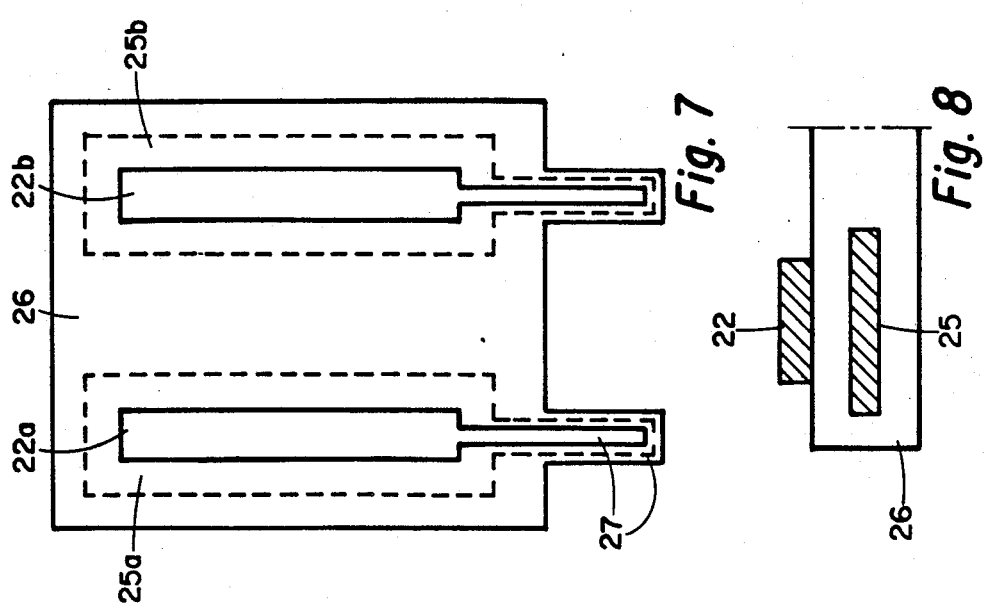
Fig. 7
Fig. 8

ELECTROMAGNETIC FLOWMETER FOR CONDUCTIVE OR DIELECTRIC FLUIDS AND ITS APPLICATIONS IN PARTICULAR OILFIELD

This invention concerns a non-intrusive electromagnetic flowmeter system for conductive or dielectric fluids. Sensors capable of measuring non-intrusively and with precision the flowrate of a fluid, possibly under high pressure (100 MPa), are rare if not non-existent. The domain of oil field services is commonly confronted with this type of problem, often aggravated by the fact that the fluid can be extremely corrosive or abrasive. A particulary pertinent example concerns operations known as acidfracking in a rocky oil-bearing formation, where hydrochloric acid, under pressures sometimes exceeding 100 MPa, is pumped through pipes of 5 to 10 centimeters in diameter, made of special steel, at flowrates giving linear stream speeds ranging from 0 to 25 m/s.

For other fracturing operations, the pumped fluids may be diesel oil-based gels, relatively viscous and containing a high proportion of sand.

Under these conditions it is indispensable that the sensor does not impede the flow of the fluid. Among the various devices used up to the present, electromagnetic flowmeters are almost the only systems which can claim to be the answer to a significant part of the problem posed by flow measurement in such circumstances. Unfortunately these flowmeters can only work with conducting fluids, whereas nearly half the applications concern insulating fluids.

The system described here combines the advantages of electromagnetic flowmeters with those of a device using a principle called cross-correlation of triboelectric noise.

The originality of the invention resides in the method of combining these two systems in an arrangement which can be used in the field under difficult conditions. When a dielectric fluid is pumped through an electromagnetic flowmeter fitted with electrodes in contact with the fluid, a signal is usually picked up, because the electrodes act as antennae sensitive to electromagnetic noise which is no longer dissipated by the conductivity of the fluid. In such a case, each of the component sensors of the system proposed in the present invention produces a signal. In order to select the significant signal—in this case that delivered by the cross-correlation device—the proposed system also includes an electronic device for measuring the conductivity of the fluid. Selection of the signal is another essential characteristic of the invention.

FIG. 1 illustrates the general arrangement of the system showing the position of the sensors and a block diagram of the electronics units.

FIG. 2 gives details of the contents of the electronic unit for measuring fluid conductance.

FIG. 3 is a sectional view of the conduit showing an example of the invention in operation.

FIG. 4 is a sectional view of a conduit showing another example of operation.

FIG. 5–11 are related to the cross-correlation part of invention. The same numbers refer to the same components in the different figures.

Figure 1:
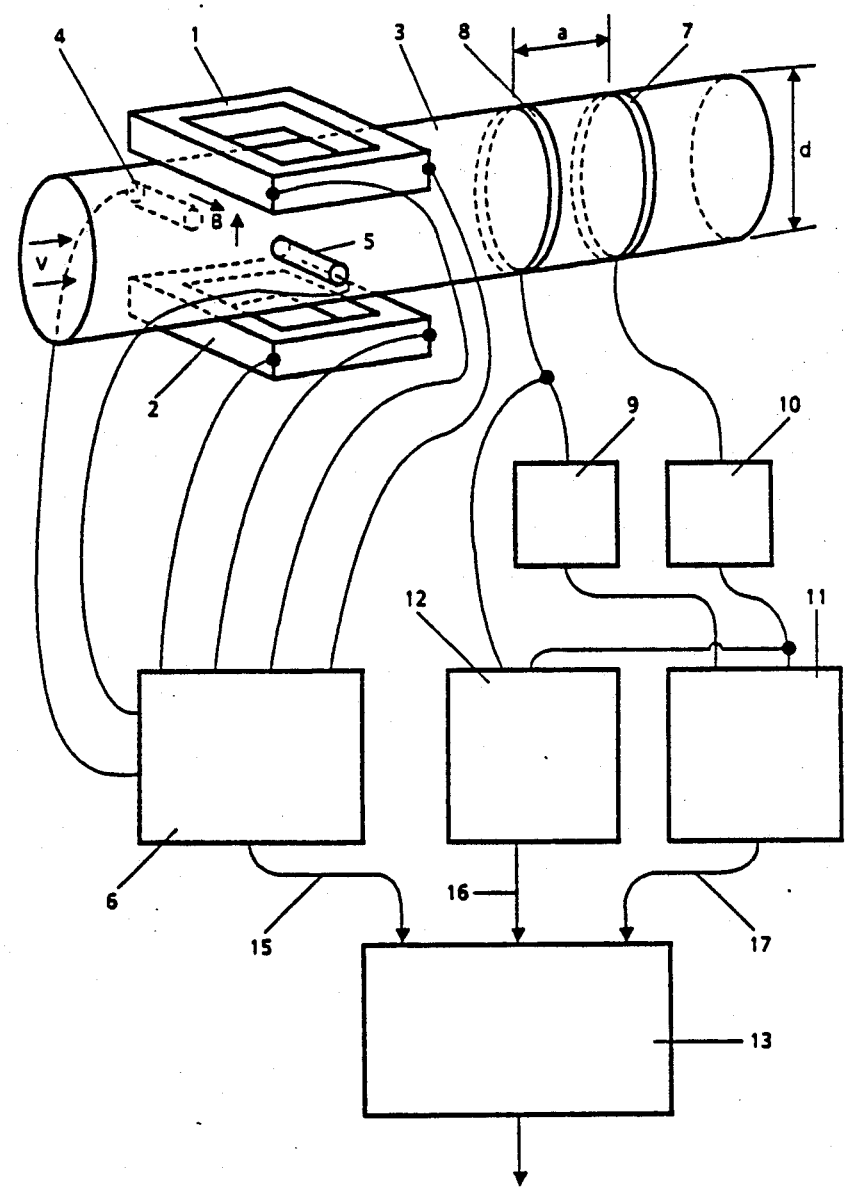

In FIG. 1, the electromagnetic flowmeter is represented by its two coils (1) and (2), generators of magnetic field B, which is perpendicular to the direction of fluid flow in the conduit, and by its electrodes (4) and (5) passing through the conduit wall to be in contact with the fluid. This arrangement corresponds to an electromagnetic flowmeter equipped with electrodes of small cross-section (also called point electrodes) in contact with the fluid. An electromagnetic flowmeter having electrodes of larger cross-section (capacitive type) could also have been represented; the general principle is well known and will not be restated here The flowmeter represented in the figure comprises an electromagnetic flowmeter (6) which controls the current in coils (1) and (2) as a function of time, and measures the voltage between electrodes (4) and (5).

In the same figure the triboelectric noise cross-correlation device consists of two signal detection antennae (7) and (8), separated by a distance (a) in the direction of flow, each connected to an electronic current amplifier (9) and (10). These units assure an "active surveillance" (active watch) of the detection antennae in such a way that signal losses between the antennae and their surroundings are annulled, and also assure approximate unity gain amplification. The outputs of the two amplifiers (9) and (10) are connected to the triboelectric cross-correlation flowmeter (11) which analyzes the time taken for the fluid to transit the distance separating the antennae. A conductance measuring device (12), connected between one of the antennae (8), and the output of the signal amplifier of the other antenna (10), measures a quantity directly associated with the conductivity of the fluid. Lastly a signal analyzer (13), receives the information provided by the two sensors: the signal (15) from the electromagnetic flowmeter (6), the signal (17) from the triboelectric noise cross-correlation flowmeter (11) and the conductance (16) between the two antennae (7 and 8). The analyzer (13) then tests the value of the conductance (16) and, according to the result, selects the correct flowrate (15) or (17).

The electrodes (4 and 5) of the electromagnetic flowmeter (6) and the antennae (7 and 8) of the cross-correlation device (11) should preferably be made using the well-known technique for flexible multilayer printed circuits, notably using photoerosion.

Figure 2:
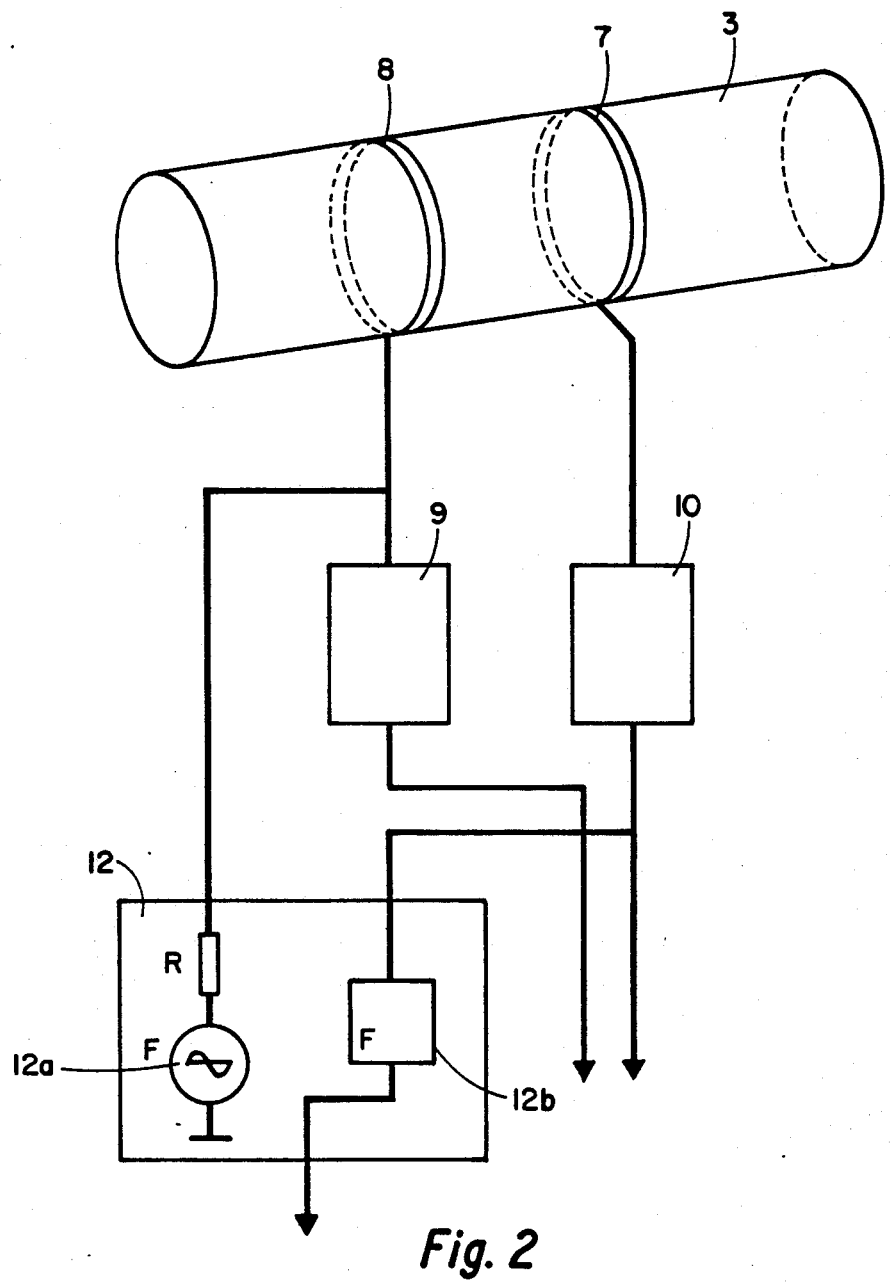

FIG. 2 shows the working principle of the interantennae conductance measuring device (12). The unit incorporates a sinusoidal oscillator (12a) generating a current of known frequency F, which is applied via a very large resistance R to one antenna (8), and a device (12b) for measuring the amplitude of the output signal of the same frequency F from the amplifier (10) connected to the other antenna (7).

The frequency F is chosen so that the conductance measurement can be made simultaneously with the calculation of the cross-correlation function in device (11), without significantly affecting the result of this calculation. In practice F is between 5 and 20 KHz, the maximum value being the practical limit for detecting the component at frequency F at the amplifier output (10).

FIG. 3 is a sectional view through a conduit (3) in which fluid is flowing, for the system resulting from the combination of an electromagnetic flowmeter, having electrodes (4 and 5) of small cross-section in contact with the fluid, and a triboelectric noise cross-correlation device, with antennae (7 and 8) fitted to the interior surface of the conduit.

The inside of the conduit covered by a uniform thickness of a dielectric such as polyurethane, which isolates the antennae (7 and 8) from the fluid whilst leaving the electrodes (4 and 5) flush with the surface. This arrangement is used particularly when fluid pressures can reach very high values and, in such cases, it is advisable to use a metallic conduit. This however should be non-magnetic so that the magnetic field B can act on the fluid. The metal may be aluminium or aluminium alloys, stainless steel or, particularly if fluid pressures are likely to exceed 100 MPa, titanium.

In the case of very high pressures, the electrode passages and antenna connections use special arrangements capable of supporting the pressure, to be described hereinafter It will be an advantage in certain cases if the conduit is of composite material based on fibres of glass, carbon or aramid, or even of a ceramic material—more particularly alumina.

Finally, FIG. (4) illustrates an application of the invention in which the conduit is made of dielectric material, on the exterior of which are mounted the large section electrodes (4 and 5) of the electromagnetic flowmeter functioning in the capacitive mode and the antennae of the triboelectric noise cross-correlation device.

The entire assembly is protected against external electromagnetic interference by an earthed conductive envelope This arrangement has the advantage of being totally non-intrusive Also, if the fluid is subject to very high pressures, it is sufficient to choose a ceramic such as alumina or a composite of glass, carbon or aramid fibres, for the material of the conduit. In the following, the flowmeter part using the cross-correlation of triboelectric noise is described in greater detail.

This part of the invention concerns the non-intrusive measurement of the volume flow rate of a dielectric type fluid flowing through a tube. An often-used principle in measurement is based on correlation techniques. The method consists in identifying turbulent structures such as eddies at two points along the tube, separated by a certain axial distance. The time interval separating identification of the same structure opposite the said points is inversely proportional to the mean velocity of the said structure, which is itself linked to the volume flow rate.

The identification method proper is well-known. It consists of finding the value in the x-axis of a point corresponding to the maximum of the cross-correlation function of the (generally electric) signals output by two identical primary sensors located on the tube and separated by a certain axial distance. Several physical principles can be implemented to construct the said primary sensors. In all cases, their output signal ought to be a representation of the turbulent state of flow. The following types of sensor merit particular mention : ultrasonic, acoustic, optical, pressure sensors, capacitive or resistive sensors.

Most of these sensors have the drawback of taking measurements which are only imperfectly representative of fluid flow across the whole tube cross-section. For example, ultrasonic sensors take measurements over a chord and capacitive sensors favour a specific plane of symmetry. For some time, therefore, there has been a need, notably in the oil industry, for a precise, reliable, sturdy flowmeter which is simple to use. The proposed flowmeter involves the use of primary sensors based on the detection of electrostatic charges generated naturally by triboelectric effect in a dielectric fluid flowing through a tube, and the combination of these primary sensors with the technique of signal cross-correlation. It has been discovered that this combination provides an answer to the specific needs of the industry.

Figure 5:
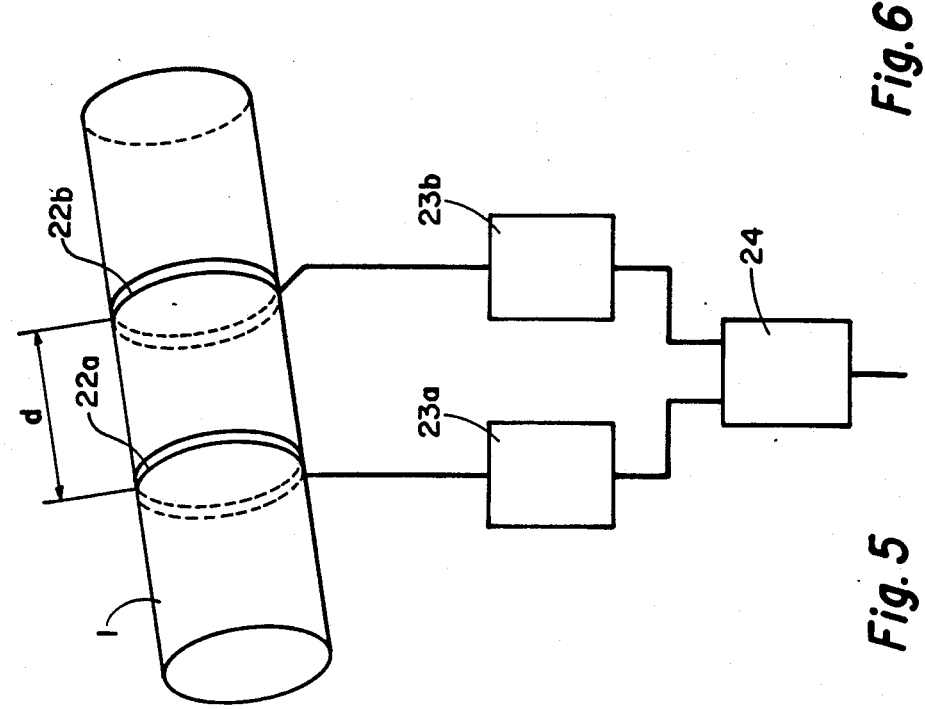

FIG. 5 is a diagram of the invention.

Figure 6:
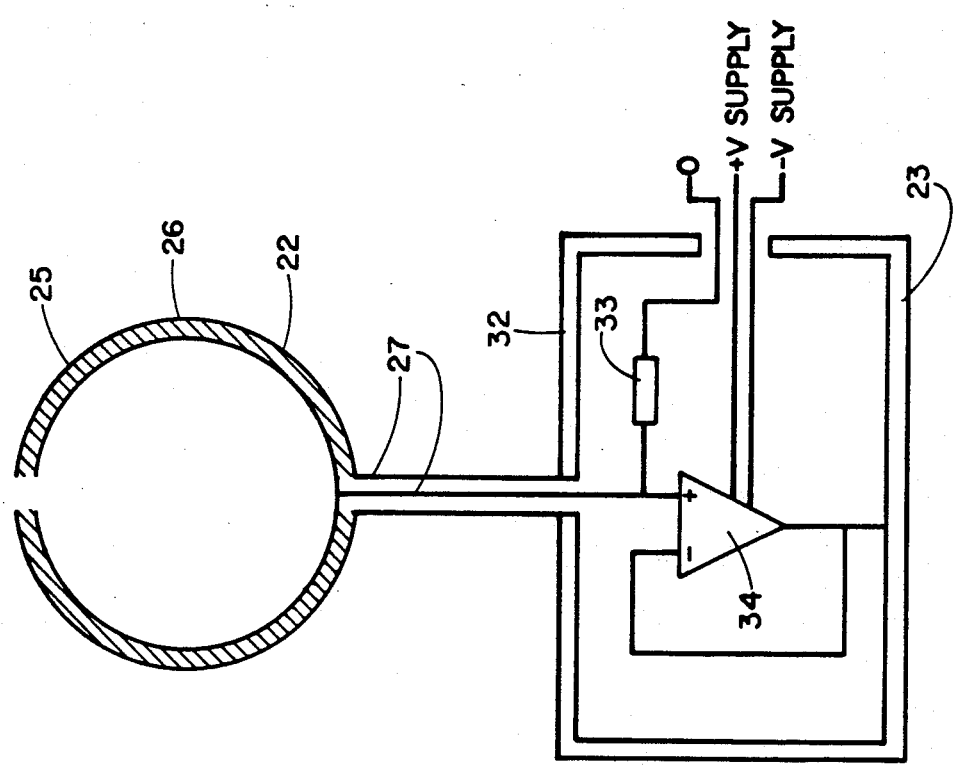

FIG. 6 is a transverse cross-sectional view of a primary sensor.

FIG. 7 gives a more detailed view of a primary sensor.

FIG. 8 is a cross-sectional view of a primary sensor.

FIG. 9 shows a configuration of the invention designed specifically for flow measurement of fluids under pressure.

FIG. 10 is a cross-sectional view showing the principle of the application shown in FIG. 5.

Figure 11:
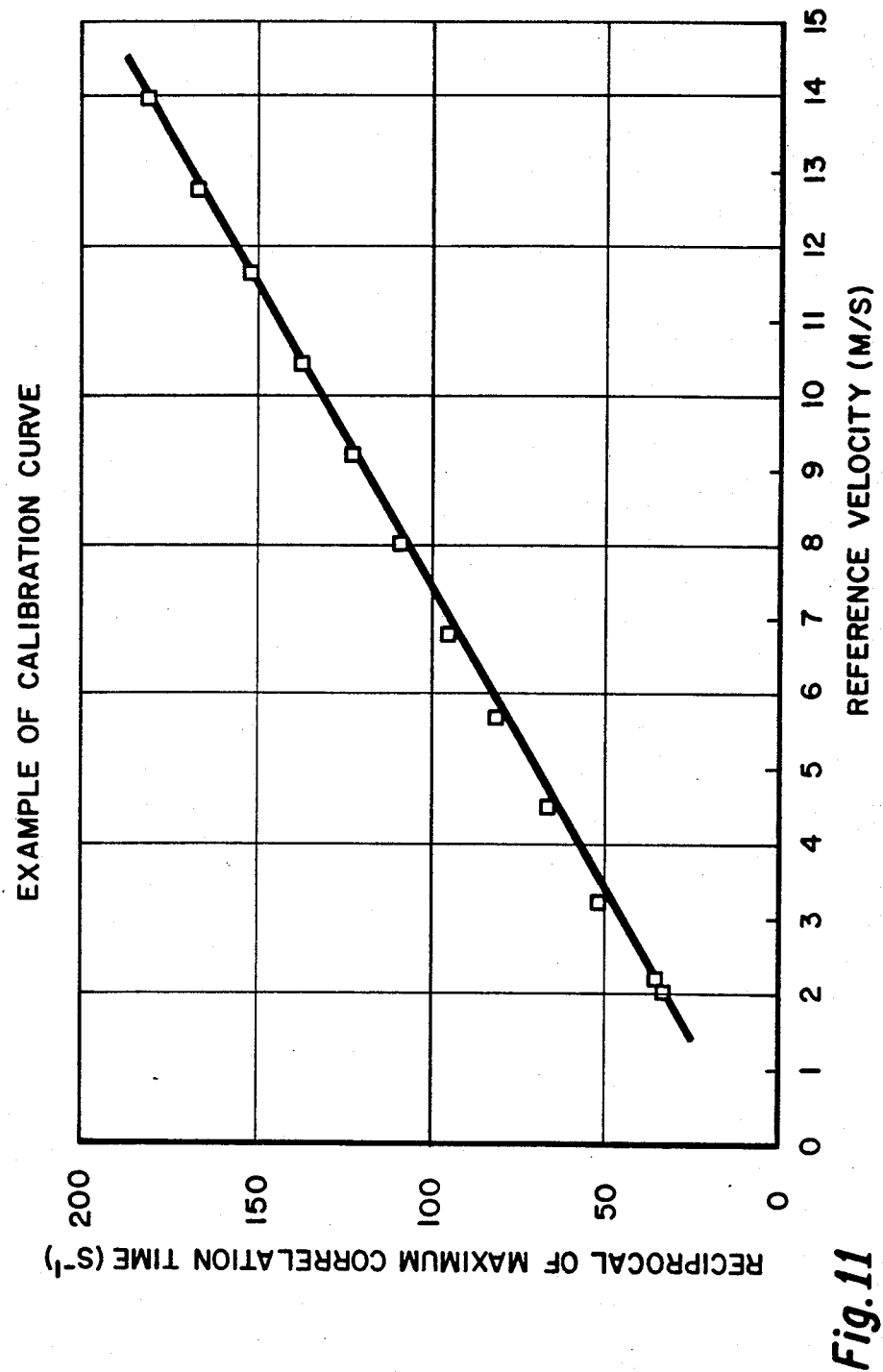

FIG. 11 is an example of a calibration curve obtained using a prototype built in accordance with invention specifications.

FIG. 5 is a diagram of the invention. The flowmeter consists of a tubular sleeve 21 made of a dielectric material such as polyurethane, teflon, plexiglass, ceramic, etc ...

The primary sensors 22.a and 22.b, which are separated by an axial distance d, are, in a preferred configuration of the invention, positioned in a way which ensures mechanical contact between them and the sleeve 21, round the entire circumference of the said sleeve. The primary sensors are placed in parallel planes perpendicular to the longitudinal axis of the sleeve 21. The primary sensors used in the proposed invention have symmetry perfectly identical with that of the conduit and are sensitive to the entire wetted cross-section of the fluid.

Sensors 22.a and 22.b are connected to two amplifiers 23.a and 23.b, the essential role of which is to provide an electrical output signal identical to the input signal, but under low source impedence conditions. The amplifier (23.a and 23.b) output signals are transmitted to a measuring and cross-correlation function calculating device 24.

FIG. 6 is detailed transverse cross-sectional view of one of the primary sensors 22.a and 22.b, consisting of two antennae 22 and 25 made of a conducting material. The inside antenna, called the detection antenna, is sensitive to the presence of electrostatic charges and is the sensing element proper of the sensor. It is surrounded over the complete circumference of the sensor by an antenna 25, which is of slightly greater transverse dimension, called the shield antenna. The detection antenna is insulated from the shield antenna by a layer of dielectric material 26. The detection antenna 22 is connected to the non-inverting entrance of a very high input impedance operational amplifier (34). The case (32) and the amplifying device (34) together comprise an amplifier (23.a or 23.b, FIG. 5). The shield antenna 25 is connected to a case 32 made of a conducting material, inside which is the amplifying device 34. The antennae 22 and 25 on the one hand and the amplifiers 23a and 23b on the other, are connected, in a preferred configuration of the invention, by means of a coaxial cable 27. The core of the coaxial cable is linked on the one hand to the detection antenna 22 and, on the other, to the non-inverting entrance to the amplifier 34. The coaxial cable screen is connected on the one hand to the shield electrode 25 and, on the other, to the case 32. The amplifier 34 exit is fed back to the inverting entrance, in order to ensure unity gain. The amplifier 34 exit is also connected to the case 32, which is connected to the shield antenna 25 by means of the screen of coaxial cable 27. This is an application of the well-known principle of the active shield : signal losses from the detection antenna 22 due to parasitic coupling are considerably reduced as a result of the fact that the said antenna is completely surrounded by a conducting surface at the same electrical potential.

A very high value resistor 33 (in all cases greater than or equal to 500 MΩ) is connected between the instrumentation reference source and the non-inverting entrance to the amplifier 34. This resistor allows polarisation currents from the amplifier 34 to escape, thus avoiding saturation of the said amplifier.

FIG. 7 shows a suggested construction for the sensor, consisting of the detection antennae 22.a and 22.b and the shield antennae 25.a and 25.b.

FIG. 8 is a cross-sectional view of part of FIG. 7. A preferred construction method for the sensor is based on photoerosion techniques well-known in the field of printed circuit manufacture. Flexible multilayer printed circuit technology merits particular mention. The thickness and/or type of the dielectric substrate 26 should be chosen in a way that ensures that the entire sensor has the flexibility required for it to be attached to the sleeve 21. This method of sensor construction ensures on the one hand that the detection planes are strictly parallel and, on the other, that the distance d axially separating them remains constant.

FIG. 9 shows a configuration of the invention more specifically designed for flow rate measurement of fluids under pressure. The tube 28 is made of a non-magnetic material, more specifically titanium or stainless steel. Each antenna 22 consisting of a flexible multilayer printed circuit, is placed flat against the inside of the tube 28 and maintained in position, possibly by gluing. The flexible printed circuit has a tongue extension 27 constituting the antenna output connections, thus avoiding the connection of a coaxial cable by soldering. This tongue is partially compound-filled with a hard dielectric material such as polyamide, in the exit aperture 30, drilled tangentially to the tube diameter.

The exit hole 30 is threaded. A metal plug 31, hollowed along its axis to allow the tongue 27 through, is screwed into the exit hole. This plug 31 is designed to absorb forces exerted against the tongue's compound filling by the high pressures (up to 100 MPa and beyond ...) which can exist inside the tube. A uniform thickness of a dielectric material 29, which is abrasion-resistant, covers the inside of the tube, thus isolating the antennae 22 from the fluid flowing through it.

The material 29 will preferably be chosen to have a low Shore hardness in order that pressures are transmitted hydrostatically. This material consists, in a preferred configuration of the invention, of polyurethane. The construction of this duct is also part of the invention.

FIG. 10 shows a configuration of the invention in which the antennae 22 are placed flat against the outside of the tube 28. The tube must, in this case, consist of a dielectric material.

In order that the effects of very high pressure fluid be resisted, the tube 28, in accordance with a specific configuration of the invention, consists of a material termed "composite", and more specifically consisting of a base of fibres of glass, carbon or aramid or of a ceramic, more particularly of alumina.

FIG. 11 is an example of a calibration curve from a flowmeter built in accordance with the invention. The fluid used is hydraulic oil of type ISO HV E 32, of which the dielectric constant is 2,30. The reference velocity is given by a turbine flowmeter. The curve displays the reciprocal of the mean time corresponding to the cross-correlation function maximum (ordinate), as a function of the fluid velocity (abscissa). Good linearity can be observed. The measurement range is wider than that shown in FIG. 11 notably where fluid velocities above 15 m/s are concerned.

We claim:
1. System for measuring flow rate of a fluid flowing through a conduit, characterized in that the system comprises an electromagnetic flow rate measuring device for conductive fluids producing an output signal and a triboelectric noise cross-correlation measuring device for measuring flow rates of dielectric fluids producing an output signal and including two antenna which are isolated from the fluid, the triboelectric noise cross-correlation device being connected to an electronic current amplifier and to an electronic device which measures conductance between said antennae, further including a signal analyzer circuit which selects a signal corresponding to a fluid flow rate measurement from signal outputs of said electromagnetic flow rate measuring device and said triboelectric noise cross-correlation device in conjunction with a conductance value.

2. Flow rate measurement system in accordance with claim 1, characterized in that the electronic device which measures conductance between the two triboelectric noise cross-correlation flowmeter antennae comprises a sinusoidal oscillator with frequency F at between 5 and 20 KHz, feeding a sinusoidal current of the same frequency to one of the two antennae through a high resistance component and a sensing device for measuring current amplitude at frequency F at an output of the current amplifier connected to the second antenna, whereby the latter current amplitude provides a direct measurement of conductance between the two antennae.

3. Flow rate measurement system in accordance with claim 1 characterized in that the electromagnetic flowmeter comprises at least two electrodes having a small electrode cross section, said electrodes being in contact with the fluid.

4. Flow rate measurement system in accordance with claim 1 characterized in that the conduit carrying the fluid is a cylinder of non-magnetic metal selected from a group consisting of: stainless steel, titanium, aluminum and alloys of these, and further that the triboelectric noise cross-correlation device antennae are flat against the inside wall of the said cylinder and are isolated from the fluid by a layer of dielectric material covering the inside wall of the cylinder with substantially uniform thickness.

5. Flow rate measurement system in accordance with claim 1, characterized in that the electromagnetic flowmeter electrodes and the antennae of the triboelectric noise cross-correlation device are assembled flat against the outside of the conduit carrying the fluid, said conduit comprises a dielectric material.

6. Flow rate measurement system in accordance with claim 5, characterized in that the conduit carrying the fluid is made of fiber-reinforced composite materials, the fiber of which is selected from a group consisting of: glass, carbon, aramid and combinations of these fibers.

7. Flow rate measurement system in accordance with claim 5, characterized in that the conduit carrying the fluid includes an alumina material.

8. Flow rate measurement system in accordance with claim 1 characterized in that the electromagnetic flowmeter electrodes and the triboelectric noise cross-correlation device antennae are formed on a single flexible multi-layer printed circuit.

9. Flowmeter for dielectric fluids having two antennae of identical geometry and made of an electrically conducting material which are separated from the fluid to be measured by a dielectric material, said antennae being positioned such that a location of one differs from that of the other by simple linear translation by a nonzero distance in a direction parallel to mean fluid flow, which occurs in immediate proximity to the two antennae said antennae each being connected to an amplifier which enables electrical charges created in fluid eddies by triboelectric effect to be amplified, and output signals from the amplifiers are connected to an electronic device which cross-correlates them and produces an output signal providing a fluid flow rate measurement characterized in that each antenna comprises paired conductors insulated from each other by a dielectric material such that a first detection conductor is placed adjacent the fluid while a second shield conductor is disposed radially outwardly of the first conductor further characterized in that each antenna comprising paired conductors is connected to an amplifier by means of a coaxial connector having a central conductor which is connected to the detection conductor and a peripheral conductor which is connected to the shield conductor and to a conductive envelope of an electronics case.

* * * * *